INVENTORS
MATTHEW P. LANGENDORF
LLOYD E. WEST
BY Frank C. Leach Jr.
THEIR ATTORNEY

DICTATING SYSTEM

Filed Dec. 30, 1963

3,288,941
DICTATING SYSTEM

Matthew P. Langendorf and Lloyd E. West, Lexington, Ky., assignors to International Business Machines Corporation, New York, N.Y., a corporation of New York
Filed Dec. 30, 1963, Ser. No. 334,210
20 Claims. (Cl. 179—100.1)

This invention relates to a dictating system having a central dictating machine and one or more remote dictating stations and, more particularly, to a control system for insuring privacy of completed dictated material on a central dictating machine from other users of the dictating stations.

In a dictating system having a central dictating machine receiving recorded material from various individuals at remote dictating stations, it is desirable that the entire recording medium of the central dictating machine be utilized before replacing it. While each individual dictator must be able to review his dictated material in order to make changes or corrections, it is desired that he not be able to review any material dictated prior to the start of his dictation.

One prior means of preventing review of previously recorded material on a central dictating machine by dictators at remote stations has been to utilize a movable mechanical stop. This mechanical stop is advanced each time that a dictator at a remote dictating station disconnects the station from the central dictating machine. However, the mechanical stop adds weight and cost to the dictating machine plus having the problem of overcoming the momentum of the movable portions of the dictating machine when the movable portions engage the mechanical stop.

The present invention satisfactorily eliminates the need of a mechanical stop by utilizing electrical circuits along with a distinctive signal at the end of any dictation by the dictator at a remote dictating station to insure privacy of the completed dictated material.

Accordingly, an object of this invention is to provide privacy of prior dictation on a central dictating machine from one or more remote dictating stations by the use of a recorded distinctive signal.

Another object of this invention is to provide electrical circuits for automatically preventing review of prior dictated material on a central dictating machine by other dictators at remote dictating stations.

The foregoing and other objects, features and advantages of the invention will be apparent from the following more particular description of the preferred embodiments of the invention as illustrated in the accompanying drawings.

Figure 1:
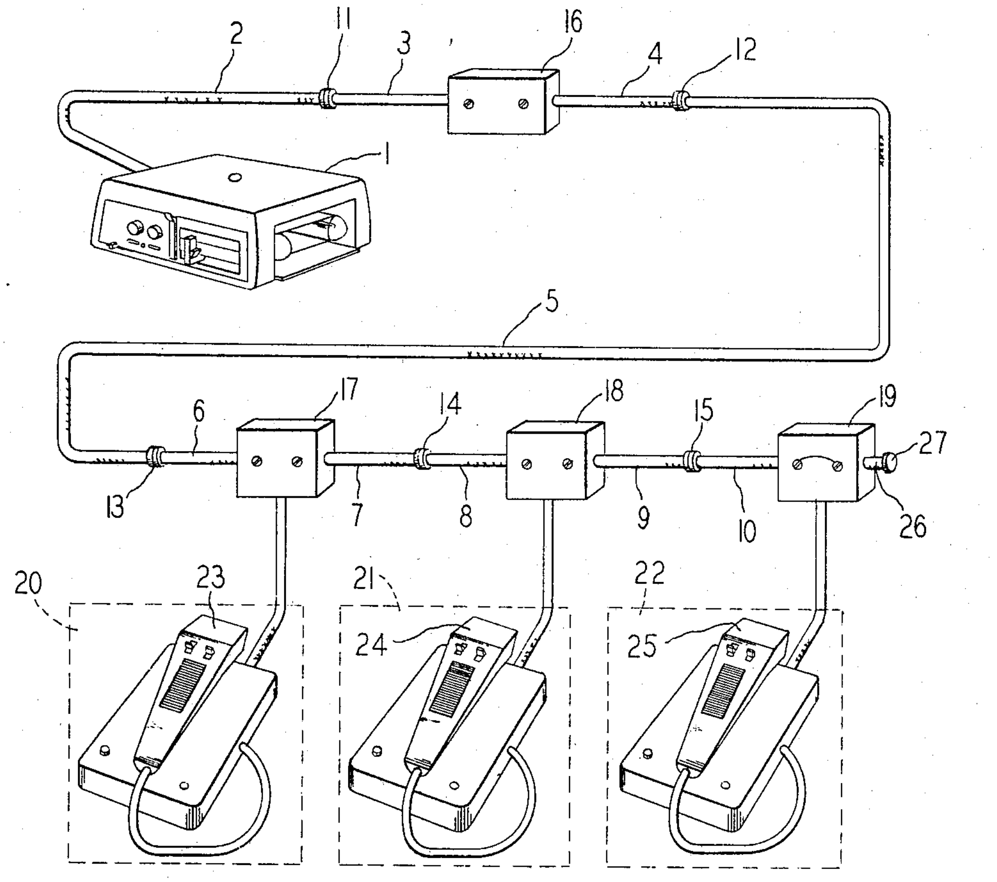
FIG. 1 is a generalized diagram of one type of dictating system in which the present invention may be utilized.

Referring to the drawings and particularly FIG. 1, there is shown a centrally located dictating machine adapted to be operated by dictators at one or more remote dictating stations. This system is described and shown in detail in the copending patent application of Nicholas J. Albanes and Matthew P. Langendorf, which was filed on Aug. 10, 1962 with Ser. No. 216,261 and now Patent No. 3,222,460. The aforesaid Albanes et al. application is owned by the same assignee as the present application. While the control system of the present invention will be described with respect to the system of the aforesaid Albanes et al. application, it should be understood that other types of remote means for actuating a central dictating machine such as a PBX system or a private telephone wire system may be employed.

As shown in FIG. 1, the dictating system includes a dictating machine 1, which is connected by cables 2–10, connectors 11–15, and junction boxes 16–19 to three remote dictating stations 20, 21, and 22. The remote dictating stations 20, 21, and 22 have associated microphones 23, 24, and 25, respectively. It should be understood that additional dictating stations may be conveniently added to the system by attachment to a cable 26 and a connector 27, if desired.

The dictating machine 1 also may be connected to a transcribing station through the junction box 16, if desired, as described in detail in the aforesaid Albanes et al. application. However, the transcribing station is not shown or described herein since it does not form a part of the present invention.

As described in the aforesaid Albanes et al. application, the lifting of any of the microphones 23, 24, and 25 from its cradle results in circuits at that dictating station being connected to circuits for actuating the dictating machine 1. At the same time, the other dictating stations are disconnected so that lifting of their microphones would not connect the dictating stations with the central dictating machine 1.

Figure 3:
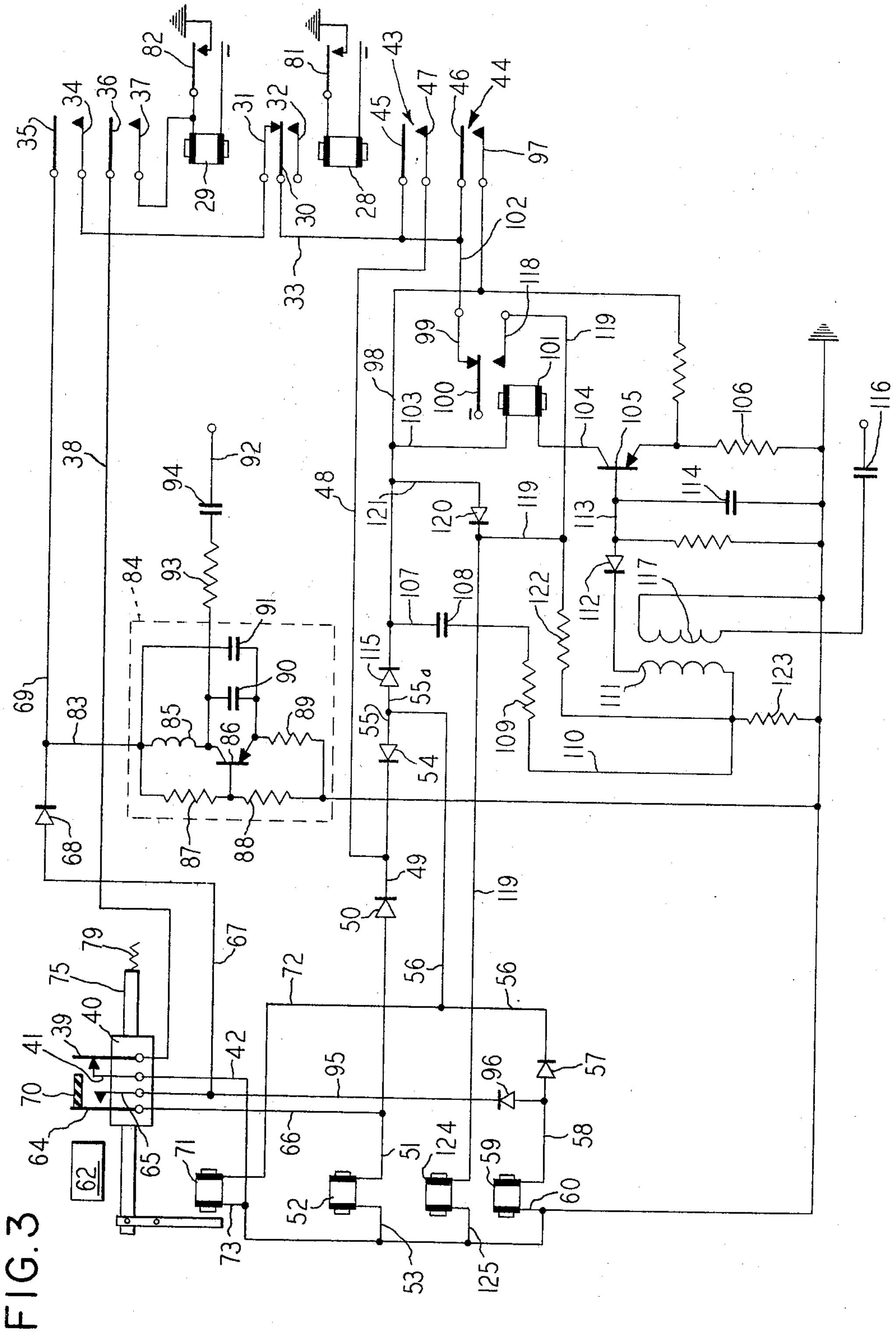
FIG. 3 is a circuit diagram of one embodiment of the control system of the present invention.

As shown in FIG. 3, a line relay 28 and a seizure relay 29 of the slight delay type, which are part of the control system of the present invention, are adapted to be disposed at the central dictating machine 1 and actuated whenever one of the microphones 23, 24, and 25 is raised from its cradle to connect the circuitry of its respective station to the central dictating machine 1.

The energization of the line relay 28 moves a contact 30 from engagement with a contact 31 to engagement with a contact 32. The contact 30 is connected to a lead 33, which has a negative voltage thereon. The negative voltage may be −35 volts D.C. with no load. This voltage may be supplied from a transformer after suitable rectification as described in the aforesaid Albanes et al. application. The contact 31 is connected to a contact 34, which cooperates with a contact 35 of the seizure relay 29.

Since the seizure relay 29 is picked when the line relay 28 is energized due to removal of one of the microphones 23, 24, and 25 from its station cradle, the contacts 34 and 35 are connected. However, because the contact 31 is not engaged with the contact 30 when the line relay 28 is picked, the connection of the contacts 34 and 35 is an open circuit.

The energization of the seizure relay 29 also closes contacts 36 and 37. The contact 37 is connected to the ground input of the seizure relay 29 while the contact 36 is connected to a lead 38, which is connected with a spring biased switch blade 39 on an insulating slider 40. The switch blade 39 cooperates with a switch blade 41, which is on the slider 40 and is connected to a grounded lead 42. During dictation, the switch blades 39 and 41 are held away from each other so that the lead 38 is an open circuit at this time. However, when dictation ceases, the switch blades 39 and 41 are in engagement so that a hold circuit is provided to maintain energization of the seizure relay 29 after the microphone is returned to its cradle.

A record switch 43 and a review switch 44 are shown in FIG. 3 with the record switch 43 having a contact 45 connected to the lead 33 and the review switch 44 having a contact 46 connected to the lead 33. It should be understood that one of the record switches 43 and one of the review switches 44 are disposed at each of the dictating stations 20, 21, and 22. However, only one of the record switches 43 and one of the review switches 44 are shown in FIG. 3 as only one set of the switches can be energized at any time and this is the set in the circuit in which the microphone has been lifted first from the cradle as explained in detail in the aforesaid Albanes et al. application . Thus, actuation of the record switch 43 or the review switch 44 of any of the other dictating stations will not provide any signal from the negative potential lead 33.

When the record switch 43 of the dictating station having its microphone actuated for dictation as described in the aforesaid Albanes et al. application is closed, the contact 45 engages a contact 47, which is connected through leads 48 and 49, a blocking diode 50, and a lead 51 to a record relay 52. The record relay 52 also is connected through a lead 53 to ground so that closing of the contacts 45 and 47 energizes the record relay 52.

The lead 48 also is connected through a blocking diode 54, leads 55 and 56, a blocking diode 57, and a lead 58 to a clutch magnet 59. The clutch magnet 59 is grounded through a lead 60. Thus, whenever the contacts 45 and 47 close, the clutch relay 59 is energized along with the record relay 52. As described in the aforesaid Albanes et al. application, the clutch magnet 59 allows a motor to drive a recording medium, which is preferably a magnetic belt 61, and a recording-reproducing means, which is preferably a sound head 62 having record, erase, and review or read windings. It should be understood that any other recording medium such as cylinders, discs, or tapes could be utilized, if desired. Of course, a different type of recording-reproducing means may be required with the other recording mediums in a well-known manner.

As described in the aforesaid Albanes et al. application, the energization of the record relay 52 results in the signal from the dictator talking into the microphone 23, 24, or 25 being coupled, after amplification, to the record winding of the sound head 62. As described in the aforesaid Albanes et al. application, picking of the record relay 52 also activates an oscillator circuit, which has its output applied to the erase winding of the sound head 62 to provide an erase signal. This removes the previously recorded material on the magnetic belt 61 as described in the aforesaid Albanes et al. application.

Accordingly, when the record switch 43 of the dictating station, which has its microphone connected by suitable circuits to the dictating machine 1, is actuated, the record relay 52 and the clutch magnet 59 are energized to permit recording from the remote dictating station on the magnetic belt 61.

During dictation, an abutment 63, which is secured to an insulating member 63*a* that is attached to an extension 62*a* of the sound head 62, is in engagement with a switch blade 64 on the slider 40. This results in the switch blade 64 contacting a switch blade 65 on the slider 40 whereby a circuit is completed from the record relay 52 through a lead 66, the closed switch blades 64 and 65, a lead 67, a blocking diode 68, and a lead 69 to the contact 35 of the seizure relay 29. Since the contact 35 is held in engagement with the contact 34 due to the energization of the seizure relay 29, the circuit continues to the contact 31. However, because the line relay 28 is picked during dictation, the contact 31 is not engaged with the contact 30 but is open.

The switch blade 64 has an insulating member 70 extending therefrom for engagement with the switch blade 39 when the switch blade 64 is moved into engagement with the switch blade 65 by the abutment 63 during dictation. The insulating member 70 urges the spring biased switch blade 39 away from the switch blade 41 so that the circuit from ground to the contact 37 of the seizure relay 29 is open although the contacts 36 and 37 are closed.

When the contacts 45 and 47 of the record switch 43 are closed at the dictating station, a negative potential is supplied to the clutch magnet 59 and the record relay 52 as previously described. This negative potential also is supplied to a forward run relay 71 through a lead 72 from the lead 56. Since the forward run relay 71 is connected to ground through a lead 73, the forward run relay 71 is picked whenever the record relay 52 is energized for dictation.

Figure 2:
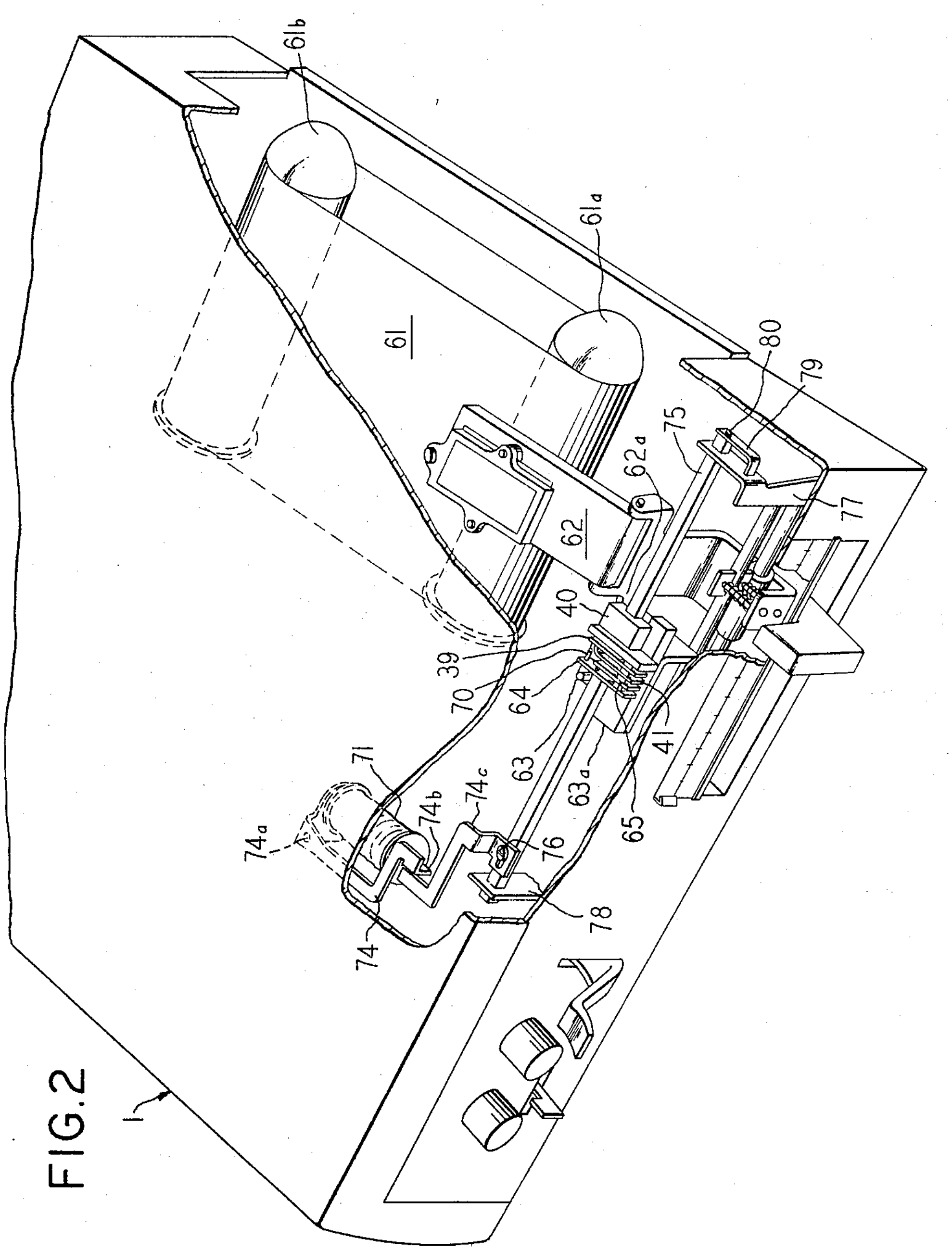
FIG. 2 is a perspective view of a portion of the central dictating machine used with the present invention.

As shown in FIG. 2, an extension 74 of the armature of the forward run relay 71 pivots about a pivot 74*a*. The extension 74 has a depending flange 74*b* adapted to contact a Z-shaped member 74*c*, which is secured to a rod 75 by suitable means such as screw 76, when the relay 71 is picked. The rod 75 is mounted for sliding movement within apertures or openings in spaced upstanding supports 77 and 78, which are secured to the dictating machine 1. The picking of the forward run relay causes the extension 74 to pivot clockwise about the pivot 74*a* so that the flange 74*b* engages the member 74*c* to move the rod 75 to the left (as viewed in FIG. 2) to overcome the force of a spring 79, which is secured by a screw 80 to the end of the rod 75 and to the support 77. The force of the spring 79 tends to move the rod 75 to the right (as viewed in FIG. 2) whenever the forward run relay 71 is dropped.

When negative potential is removed from the lead 72 due to opening of the record switch 43, the spring 79 moves the rod 75 slightly to the right (as viewed in FIG. 2) to move the slider 40 so that the switch blade 64 is removed from contact with the abutment 63 of the sound head 62. While this is a very slight movement, it is sufficient to remove the insulating member 70 from contact with the switch blade 39 whereby the spring biased switch blade 39 engages the switch blade 41. At the same time, the switch blade 64, which is resiliently biased, moves away from engagement with the switch blade 65 to open the circuit therebetween. While the slider 40 is adapted to be moved along the rod 75 by the abutment 63 of the sound head 62 when the sound head 62 is advanced for dictation, it has a friction fit with the rod 75 so that it moves whenever the rod 75 is moved.

If the dictator merely opened the record switch 43 for a slight period of time and did not intend to cease dictating by hanging up the microphone on its station cradle, the closing of the record switch 43 again by the dictator will result in energization of the forward run relay 71. This causes movement of the rod 75 to the left (as viewed in FIG. 2) to move the slider 40 so that the switch blade 64 is again in contact with the abutment 63 of the sound head 62 to again close the switch blades 64 and 65 and open the switch blades 39 and 41.

However, if the dictator at the remote dictating station were to place the microphone on the station cradle, irrespective of whether the record switch 43 is open or closed, a switch 81 in the connection from ground to the line relay 28 opens to drop the line relay 28 whereby the contact 30 engages the contact 31. At the same time, a switch 82 in the line connecting the seizure relay 29 to ground also opens.

When the microphone is returned to its station cradle, it disconnects the record switch 43 so that negative potential is removed from the lead 48. As a result, the record relay 52, the clutch magnet 59, and the forward run relay 71 are deactivated.

At the same time, the switch blades 39 and 41 are again closed due to the force of the spring 79 moving the rod 75 when the forward run relay 71 is dropped. As a result, a circuit is completed from ground through the contacts 36 and 37 of the seizure relay 29 to the ground input of the seizure relay 29 so that the seizure relay 29 will have a hold circuit to maintain it picked. It should be understood that the contacts 36 and 37 will remain closed for a slightly longer period after the switch 82 opens to insure that the seizure relay 29 is not dropped before the switch blades 39 and 41 close.

With the seizure relay 29 picked by its hold circuit through the contacts 36 and 37, the contacts 34 and 35 remain closed. Since the dropping of the line relay 28 results in the contact 30 engaging the contact 31, negative potential is supplied from the lead 33 to the lead 69 through the closed contacts 34 and 35. The negative potential on the lead 69 is applied through a lead 83 to a tone generator 84.

The tone generator 84 is preferably a modified Colpitts oscillator. The oscillator includes an inducetance 85 connected to the collector of a PNP transistor 86. The base of the transistor 86 is connected between resistances 87 and 88 with the emitter of the transistor 86 connected to ground through a resistance 89. The oscillator also includes capacitors 90 and 91. The output of the tone generator 84 is connected through a lead 92, which has a resistance 93 and a capacitor 94 therein, to the record winding of the sound head 62 after suitable amplification.

The oscillator generates an audio tone of a fixed frequency, which depends on the value of the capacitors 90 and 91. It will be observed that this frequency is generated as long as a negative potential is supplied through the lead 83 to the input of the oscillator. It should be understood that any other type of oscillator or other suitable means may be employed to produce a distinctive signal, which may be other than an audio tone such as a fixed frequency higher than the audio range or a coded D.C. signal, for example. It also should be understood that any type of signal, which is distinctive from the signals created by the human voice, may be employed.

The negative potential, which is supplied to the lead 69 through the closed contacts 34 and 35, also is applied to the clutch magnet 59 through the blocking diode 68, the lead 67, a lead 95, a blocking diode 96, and the lead 58. As a result, the clutch magnet 59 is energized at the same time that the tone generator 84 starts to send forth an audio output.

The energization of the clutch magnet 59, as explained in the aforesaid Albanes et al. application, causes advancement of the sound head 62 and rotation of the belt 61 about rollers 61*a* and 61*b*. As the sound head 62 advances, the abutment 63 engages the switch blade 64 to close the switch blades 64 and 65. The closing of the switch blades 64 and 65 results in the negative potential on the lead 69 being applied to the record relay 52 through the blocking diode 68, the lead 67, the closed switch blades 65 and 64, and the lead 66. Thus, the record winding of the sound head 62 is energized to begin to record, after amplification, the output of the tone generator 84 when the switch blades 64 and 65 are closed. The length of the insulating member 70 allows the audio output from the tone generator 84 to be recorded on two and one half revolutions of the magnetic belt 61 before the insulating member 70 removes the switch blade 39 from engagement with the switch blade 41. Accordingly, the audio output of the tone generator 84 is recorded for approximately 15 seconds since one revolution of the magnetic belt 61 requires six seconds.

When the insulating member 70 opens the switch blades 39 and 41, the hold circuit for the seizure relay 29 through the contacts 36 and 37 is broken. This results in the opening of the contacts 34 and 35 to remove negative potential from the tone generator 84, the clutch magnet 59, and the record relay 52.

Thus, an audio signal of a given frequency has been recorded at the completion of the dictated material from a particular dictating station. It should be observed that the automatic recording of the audio tone cannot begin until the microphone at the remote dictating station is placed on its cradle to turn an on-off switch to its "off" position. Furthermore, it should be understood that the seizure relay 29 includes contacts (not shown) to prevent connection of any of the other dictating stations with the central dictating machine 1 until the recording of the audio tone is completed. Of course, after the seizure relay 29 is dropped, another dictating station may have its circuitry energized for connecting the dictating station and the central dictating machine, as described in detail in the aforesaid Albanes et al. application.

If the operator at the dictating station desires to review some of the dictated material after completing the dictation, it is necessary to close the playback or review switch 44. If the microphone at the remote dictating station is returned to its cradle to disconnect the circuitry of the remote dictating station from the central dictating machine 1 without completing review of all of the dictated material, the sound head 62 is spaced from the switch blade 64.

Accordingly, it is first necessary to return the sound head 62 to the position in which recording of the audio signal from the tone generator 84 could be made without recording over the prior dictated material on the magnetic belt 61. It should be observed that the switch blades 64 and 65 are not closed until the sound head abutment 63 engages the switch blade 64. With the switch blades 64 and 65 open, the record relay 52 is not picked by negative potential on the lead 69. However, the clutch magnet 59 is energized whereby the sound head 62 advances until it engages the switch blade 64. Of course, the tone generator 84 is supplying the fixed frequency through the output lead 92 to the sound head 62 but it can not be recorded until the record relay is picked to energize the record winding of the sound head 62. Accordingly, it is immaterial as to when the remote dictating station is disconnected from the central dictating machine 1 insofar as the location of the sound head 62 is concerned.

When another dictating station is connected to the central dictating machine for dictation or the same station is again connected after the microphone is hung up, the line relay 28 and the seizure relay 29 are again picked. As previously described, this enables material to be recorded on the magnetic belt 61 whenever the contacts 45 and 47 of the record switch 43 are closed. As previously set forth, there is only one line relay and one seizure relay for the entire system. However, there are one of the record switches 43 and one of the review switches 44 at each of the stations; these can only be connected when that particular station is connected to the central dictating machine 1.

With the record switch 43 of FIG. 3 being in the circuit of the remote station that is connected to the central dictating machine 1 in the manner described by the aforesaid Albanes et al. application, closing of the review switch 44 moves the contact 46 into engagement with a contact 97 to provide negative potential from the lead 33 to a lead 98. It should be observed that the lead 33 is connected to negative potential through contacts 99 and 100 of a playback or review relay 101 and a lead 102. The contacts 99 and 100 are closed when the relay 101 is deactivated so that negative potential is always on the line 33 when the contacts 99 and 100 are closed.

With the contacts 46 and 97 closed, negative potential is supplied from the lead 98 through a lead 103 to the review relay 101. The review relay 101 is connected to ground through a lead 104, a PNP transistor 105, and a resistance 106. Thus, the transistor 105 functions to control the review relay 101 whenever a negative potential is supplied through the lead 103 to the relay 101. It should be understood that other types of control elements than the transistor 105 may be employed, if desired.

When negative potential is applied to the relay 101 through the lead 103, it also is supplied through a lead 107, a capacitor 108, a resistance 109, a lead 110, an inductance 111, a blocking diode 112, and a lead 113 to the base of the transistor 105. This input signal to the base of the transistor 105 through the lead 113 is delayed for approximately 50 milliseconds by a capacitor 114, which is connected between the lead 113 and ground.

The reason for the delay of the input to the base 105 is to permit time for the clutch magnet 59 to be energized and get the belt 61 up to speed. The clutch magnet 59 is energizezd from negative potential on the lead 98 through a blocking diode 115, a lead 55*a*, the lead 56, the blocking diode 57, and the lead 58.

The negative potential also is supplied through the lead 72 to the forward run relay 71 to pick the relay 71. The forward run relay 71 is picked when the review switch 44 is closed to insure that the audio tone from the tone generator 84 is recorded if the individual at the remote dictating station should hang up the microphone on the cradle to disconnect the remote station from the central dictating machine 1 when he has completed listening to the dictated material and gone beyond the dictated area. Otherwise, the hold circuit for the seizure relay 29 would not be made because the sound head 62 would have moved the insulating member 70 into contact with the switch blade 39 when the dictator maintained the review switch 44 closed beyond the finish of his dictated material. The picking of the relay 71 allows the same relative movement when the relay 71 is dropped as during recording.

With the clutch magnet 59 energized, the sound head 62 is moved over the magnetic belt 61. The output of the review or read winding of the sound head 62, after amplification, is supplied to a circuit including a capacitor 116 and an inductance 117. The capacitor 116 and the inductance 117 are adjusted so that they are tuned to resonate at the frequency of the output of the tone generator 84.

Thus, if the review or read winding of the sound head 62 is receiving a signal from the audio output of the tone generator 84 recorded on the magnetic belt 61, a voltage is induced in the inductance 111 through being coupled with the inductance 117. The voltage induced in the inductance 111 is rectified by the blocking diode 112 and the capacitor 114 so that only the negative portion of the induced voltage is applied to the input of the transistor 105.

After the slight delay of the signal passing from the lead 98 to the input of the transistor 105 through the capacitor 108, the signal reaches the transistor base. The value of this signal is sufficient to allow the review relay 101 to be picked due to the negative voltage being applied through the lead 103.

The picking of the relay 101 results in the contact 100 moving into engagement with a contact 118, which is connected to a lead 119. When the contact 100 moves from engagement with the contact 99 to engagement with the contact 118, negative potential is removed from the lead 33 so that it may not be supplied through the record switch 43 or the playback switch 44. This prevents any recording on the magnetic belt 61 while the contacts 100 and 118 are engaged.

Negative potential is supplied through the contact 118, the lead 119, a blocking diode 120, and a lead 121 to the lead 98. This results in a negative potential being applied to the lead 98 although it is now no longer supplied through the review switch 44. Thus, negative potential is still maintained at the leads 103 and 107 and the lead 56. However, negative potential applied through the lead 107 eventually charges the capacitor 108, which is much larger than the capacitor 114, so that no input signal may be supplied to the base of the transistor 105 through the capacitor 108 after a predetermined period of time.

However, negative potential is applied from the lead 119 through a resistance 122 to the lead 110. It should be observed that a resistance 123 is connected between ground and the junction of the resistance 122 and the lead 110. Accordingly, negative potential is still applied to the base of the transistor 105 but is now through the resistance 122 rather than through the capacitor 108 and the resistance 109. The value of this signal is determined by the relationship of the resistance 122 to the resistance 123.

It should be understood that the value of negative voltage supplied across and through the resistance 122 is not the same at the base of the transistor 105 as when the signal is supplied through the capacitor 108 and the resistance 109 but is much smaller. Accordingly, the signal from negative potential applied through the resistance 122 is not sufficient to permit the relay 101 to remain picked. However, when this value is combined with the negative voltage induced in the inductance 111 due to the frequency of the audio output of the tone generator 84 on the magnetic belt 61, the two voltages are sufficient to maintain the transistor 105 condcuting so that the relay 101 remains picked.

If the sound head 62 is not receiving a signal from a portion of the magnetic belt having the audio output of the tone generator 84 recorded thereon, the transistor 105 cuts off to drop the relay 101 as soon as the capacitor 108 charges. However, if the sound head 62 is over the recorded audio output of the tone generator 84 on the magnetic belt 61, the negative voltage induced in the inductance 111 is sufficient with the negative voltage applied through the resistance 122 whereby the transistor 105 continues to conduct.

Thus, as long as the sound head 62 is receiving a signal from the audio output of the tone generator 84 on the magnetic belt 61, the relay switch 101 remains picked. However, as soon as the sound head 62 advances beyond the position of the magnetic belt 61 in which the audio output of the tone generator 84 is recorded thereon, the induced voltage in the inductance 111 falls to a very small value so that the transistor 105 stops conducting and the relay 101 drops.

When the relay 101 is dropped, the contact 100 moves from engagement with the contact 118 to the contact 99 to again supply negative potential to the lead 33. At the same time, the capacitor 108 discharges through the lead 107, the blocking diode 115, the lead 55*a*, the lead 56, the blocking diode 57, the lead 58, the clutch magnet 59, and the lead 60 to ground and then through the resistance 123, the lead 110, and the resistance 109.

With the contacts 99 and 100 again closed, the closing of the record switch 43 or the review switch 44 causes recording or review. If the review switch 44 is closed, the same process repeats itself as previously described so that there is always a sampling of the material recorded on the magnetic belt 61.

If the sound head 62 is receiving signals from the portion of the magnetic belt 61 in which the audio output of the tone generator 84 is recorded, it should be noted an attempt to actuate the review switch 44 will not activate the relay 101. Thus, the dictator at the remote dictating station cannot utilize the review switch 44 to return beyond his own recorded material as the audio output from the tone generator 84 prevents this.

Additionally, any effort to stop playback or review of the magnetic belt 61 during the period in which the audio output of the tone generator 84 is recorded on the magnetic belt 61 is prevented because negative potential from the inductance 111 and the circuit through the resistance 122 remains at the input of the transistor 105 until the magnetic belt 61 advances to where the audio tone is no longer on the belt. Furthermore, any effort by the dictator at the remote dictating station to attempt to energize the record relay 52 and erase a portion of the signal from the tone generator 84 on the magnetic belt 61 is prevented because the contact 99 is no longer connected to negative potential. Therefore, closing of the record switch 43 will not pick the record relay 52 when the review relay 101 is picked.

It also should be noted that closing of the contacts 100 and 118 when the relay 101 is picked automatically supplies a negative voltage to a kickback or review relay 124 through the lead 119. The kickback relay 124 also is connected to ground through a lead 125. Therefore, when a negative potential is applied to the lead 119, the kickback relay 124 is picked to move the sound head 62 rearward with respect to the magnetic belt 61 as described in the aforesaid Albanes et al. application. The kickback relay 124 can produce only one reversal, which allows review of one revolution of the belt 61 (about six seconds), until it is again picked.

The possibility always exists that a portion of the audio tone, which is to be recorded on the magnetic belt 61 from the tone generator 84, may not be recorded because of a particle on the magnetic belt 61 or the sound head 62 during a portion of the recording. Accordingly, the possibility exists that the audio signal from the magnetic belt 61 to the series circuit of the capacitor 116 and the inductance 117 may drop out for a fraction of a period of time. This presents two problems.

One problem is when the review switch 44 is open and the voltage ceases to be induced in the inductance 111 whereby there is not sufficient voltage to maintain the transistor 105 conducting. Accordingly, the relay 101 would be dropped. However, the capacitor 114 is made sufficiently large so that its discharge is sufficient to maintain the transistor 105 in a conducting state for a short dropout of the audio tone on the magnetic belt 61. If this provision is not made, the reduction of the negative voltage in the inductance 111 results in the clutch magnet 59 being de-energized since the negative potential is removed from the contact 118 due to the relay 101 dropping. Of course, in this situation with the review switch 44 open, no negative potential is applied through the leads 33 and 98 to the clutch magnet 59.

The second problem results from the review switch 44 being held closed and the tone dropout being longer than the discharge period of the capacitor 114. In this situation, a dropout of the audio tone on the magnetic belt 61 results in the transistor 105 ceasing to conduct to thereby drop the relay 101. With negative potential supplied to the lead 98 as soon as the contacts 99 and 100 close because the review switch 44 is closed, negative potential would be applied through the lead 103 to the review relay 101. However, the capacitor 108 is fully charged and cannot discharge because of negative potential on the lead 98. Accordingly, insufficient current flows to the base of the transistor 105 to allow conduction of the transistor 105 whereby the relay 101 cannot be picked. However, the clutch magnet 59 is still actuated because of negative potential on the lead 98 and the sound head 62 continues to advance until the switch 44 is opened.

Considering the operation of the circuit of FIG. 3 in conjunction with the structure of FIGS. 1 and 2, it will be assumed that the dictator at the station 21 lifts the microphone 24 from its cradle to allow the on-off switch to be moved to its "on" position. As a result, all of the other dictating stations are prevented from any activation of their circuits in connection with the dictating machine 1 if their microphones are lifted from the cradle as shown and described in the aforesaid Albanes et al. application. When the microphone 24 is lifted from its cradle to connect the remote dictating station 21 to the central dictating machine 1, the line relay 28 and the seizure relay 29 are picked by closing of the switches 81 and 82, respectively, when connection is made bewteen the remote dictating station 21 and the central dictating machine 1.

As previously explained, the record switch 43 and the review switch 44 of FIG. 3 represent the record switch and the review switch of any of the dictating stations depending on which one is energized. However, the switch 43 and the switch 44 can only be actuated for connection to the leads 48 and 98, respectively, when the remote dictating station is connected to the central dictating machine 1.

Accordingly, if the record switch 43 is energized, the record relay 52 and the clutch magnet 59 are energized along with the forward run relay 71. This advances the sound head 62 over the magnetic belt 61 as the belt revolves to record the information supplied through the microphone 24 from the remote dictating station 21 as described in the aforesaid Albanes et al. application. During recording, the sound head 62 has the abutment 63 holding the switch blades 64 and 65 closed and the switch blades 39 and 41 open.

When the record switch 43 is opened, the clutch magnet 59, the record relay 52, and the forward run relay 71 are deactivated. As a result of the dropping of the forward run relay 71, the spring 79 urges the rod 75 so that the switch blades 39 and 41 close while the switch blades 64 and 65 are opened.

If review of the information already dictated on the magnetic belt 61 by the dictator at the station 21 is desired, the review switch 44 is closed. Since it is assumed that the dictator at the station 21 is the first to dictate on this particular magnetic belt, there is no audio tone on the belt 61. Accordingly, closing of the review switch 44 results in the kickback relay 124 being energized along with the clutch relay 59 and the forward run relay 71. This picking of the kickback relay 124, as described in the aforesaid Albanes et al. application, causes rearward movement of the sound head 62 with respect to the magnetic belt 61. After the rearward movement, the clutch magnet 59 permits a motor (not shown) through suitable gearing (not shown) to drive the sound head 62 forward while also revolving the magnetic belt 61, as described in the aforesaid Albanes et al. application, so that the sound head 62 may receive signals from the recorded material on the belt 61.

If the dictator at the dictating station 21 listens to all of his recorded material, the abutment 63 again engages the switch blade 64 to close the blades 64 and 65 and open the switch blades 39 and 41. If the remote dictator then replaces the microphone 24 at the station 21 on its cradle to move the on-off switch to its "off" position, the circuitry of the dictating station 21 is disconnected from the central dictating machine 1 as described in the aforesaid Albanes et al. application. This results in dropping of the line relay 28 due to opening of the switch 81. However, the seizure relay 29 remains picked despite opening of the switch 82 because of the hold cicuit, which includes the closed contacts 36 and 37 and the closed switch blades 39 and 41. Of course, the switch blades 39 and 41 were closed as a result of the spring 79 moving the slider 40 with respect to the sound head 62 when the forward run relay 71 was dropped.

As previously set forth, the seizure relay 29 controls a circuit (not shown) whereby no dictating station can be connected to the central dictating machine 1 until the seizure relay 29 is dropped. With the seizure relay 29 picked, the contacts 34 and 35 remain closed whereby an audio tone is generated from the tone generator 84 since a negative potential is now applied from the lead 33. The closed contacts 34 and 35 also permit the supplying of negative potential to the clutch magnet 59 so the sound head 62 advances to close the switch blades 64 and 65. This energizes the record relay 52 whereby the audio output from the tone generator 84 is recorded on the magnetic belt 61. After recording the audio tone for 2½ revolutions (about 15 seconds) of the magnetic belt 61, the abutment 63 of the sound head 62 moves the insulating member 70 of the switch blade 64 sufficiently to open the switch blades 39 and 41 to drop the seizure relay 29. The dropping of the seizure relay 29 permits any of the remote dictating stations to be connected to the central dictating machine 1 by lifting of the microphone.

It should be understood that if the dictator at the remote dictating station 21 had not reviewed all of his material but had disconnected the remote station 21 from the central dictating machine 1 without review of all of the recorded material, the sound head 62 would be at some position with the abutment 63 spaced from the switch blade 64. Therefore, no recording would occur until the abutment 63 engaged the switch blade 64 to close the blades 64 and 65. Thus, this insures that the recording of the audio tone is at the end of the dictated material on the magnetic belt 61 and not over previously recorded material.

After the seizure relay 29 has been opened by completion of recording of the audio tone on the magnetic belt 61, it will be assumed that the microphone at the station 20 is lifted from its cradle to connect the station 20 to the central dictating machine 1 as described in the aforesaid Albanes et al application. At this time, the line relay 28 and the seizure relay 29 are again picked. As previously set forth, it should be understood that the record switch 43 and the review switch 44 of FIG. 3 now represent the record switch and the review switch of the dictating station 20. As previously mentioned, the switches 43 and 44 cannot be connected to the leads 48 and 98, respectively, except when the circuitry of the remote dictating station is connected to the central dicating machine 1.

If the dictator at the remote dictating station 20 wishes to dictate, the record switch 43 is closed and dictation occurs as previously described. Similarly, if the dictator wishes to review any of his dictated material, the review switch 44 is closed to pick the kickback relay 124.

However, the dictator at the remote station 20 cannot go beyond the material he has recorded. This is because a signal from the audio tone on the magnetic belt 61 will be supplied through the inductance 111 to the control transistor 105 whereby the relay 101 cannot be picked as long as the voltage due to the audio tone is being received at the inductance 111. Thus, even if the review switch 44 is held closed, it is impossible to kickback the sound head 62 for review of the material recorded on the magnetic belt 61 prior to recording the audio tone of the tone generator 84. It also is impossible to actuate the record relay 52 by closing the record switch 43 as long as the sound head 62 is receiving the audio tone from the magnetic belt 61 to prevent recording over the audio tone to remove it from the belt 61. Therefore, the dictator at the remote station 20 is unable to listen to the prior dictated material of the remote station 21 since he cannot actuate the central dictating machine 1 to return the sound head 62 to review the material recorded prior to the audio tone.

It should be understood that the present invention may be employed with only one remote station because the present invention prevents anyone at even that remote station from listening to the previously recorded material after the microphone is returned to its cradle to disconnect the circuits of the remote station from the central dictating machine 1. Accordingly, if two different individuals were using the same remote dictating station, the present invention would satisfactorily prevent the second user of the same remote station from listening to the recorded material of the first dictator at the same remote station. This is because the disconnection of the circuits of the remote station from the central dictating machine 1 prevents any further energization or connection to the central dictating machine 1 until the audio tone is recorded and the audio tone serves to prevent any backtracking into the previously recorded material.

Figure 4:
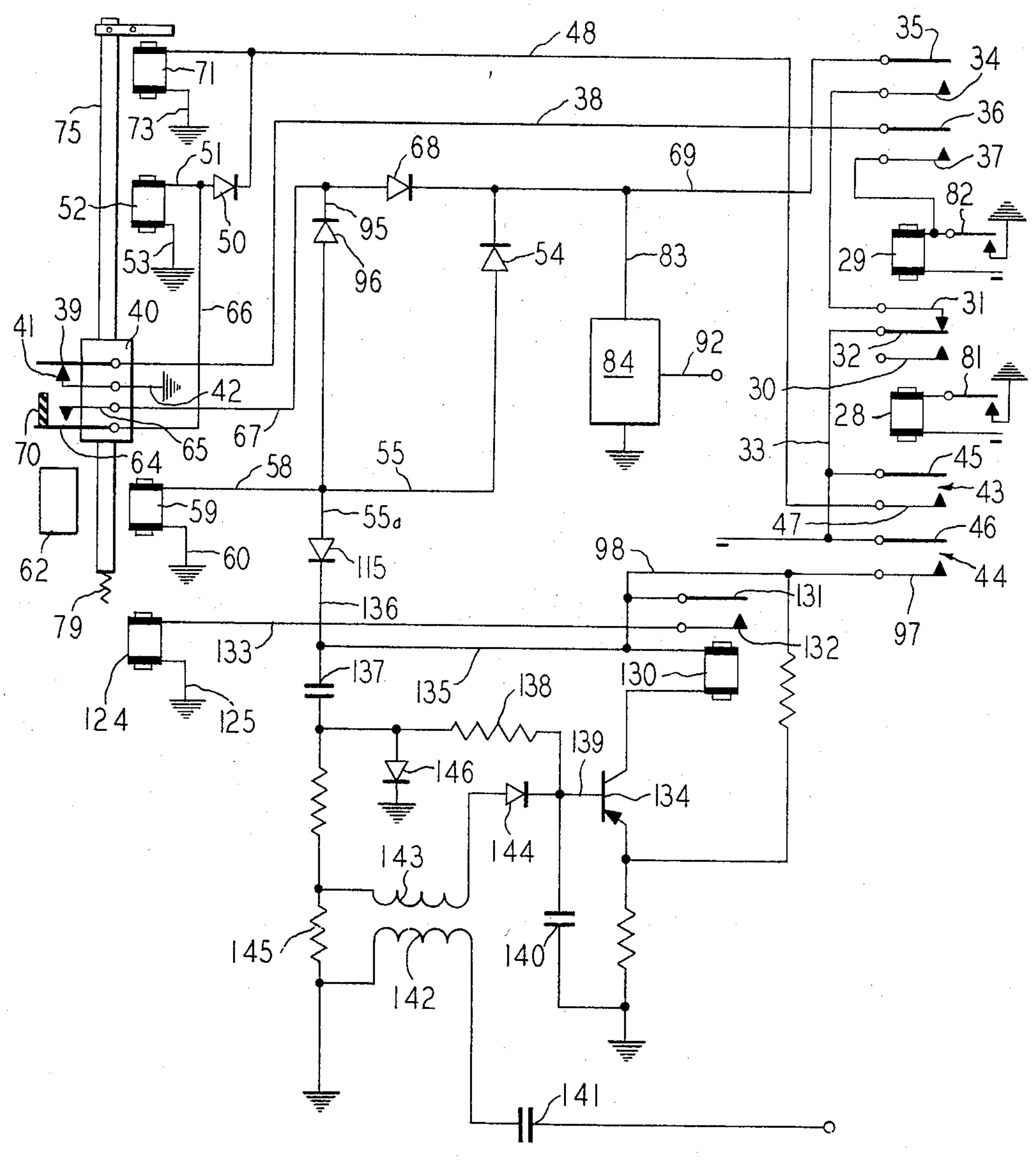
FIG. 4 is a circuit diagram of another embodiment of the control system of the present invention.

Another record insulation circuit for providing privacy of the previously dictated material is shown in FIG. 4 wherein the same or similar parts of the circuit of FIG. 3 are identified by the same reference numerals. Thus, the lead 48 still supplies negative potential to the record relay 52. Likewise, negative potential is supplied through the lead 69 to the tone generator 84 and to the clutch magnet 59. The lead 69 also supplies negative potential to the switch blade 64. Similarly, the lead 38 still provides connection between the contact 36 of the seizure relay 29 and the switch blade 39 on the slider 40.

One distinction is that the forward run relay 71 is now picked only when the record switch 43 is closed rather than when either the record switch 43 or the review switch 44 is closed as in the modification of FIG. 3. Furthermore, the lead 33 is always connected to negative potential in the modification of FIG. 4 rather than being controlled by a relay as in FIG. 3.

As shown in FIG. 4, the lead 98, which is connected to the contact 97 of the review switch 44, is connected to a review relay 130. The review relay 130 controls a pair of normally open contacts 131 and 132. However, when the relay 130 is picked, the contacts 131 and 132 close.

The contact 131 is connected to the lead 98 so that it has negative potential thereon. Thus, when the contacts 131 and 132 are closed, negative potential is supplied through a lead 133, which connects the contact 132 to the kickback relay 124 whereby the kickback relay is picked. As described in the aforesaid Albanes et al. application, the picking of the kickback relay 124 causes rearward movement of the sound head 62 with respect to the magnetic belt 61 to permit review of the recorded material on the magnetic belt 61.

When the review switch 44 is closed, negative potential is applied to the lead 98 whereby negative potential is applied not only to the review relay 130 but also to the clutch magnet 59 and to a PNP transistor 134. Negative potential is applied from the lead 98 to the clutch magnet 59 through a lead 135, a lead 136, the blocking diode 115, the lead **55*a*, and the lead 58. Thus, whenever the review switch 44 is closed, the clutch magnet 59 is automatically energized to start forward drive of the sound head 62 and revolving of the belt 61 about the rollers 61*a* and 61*b***.

It will be recalled from the description of FIG. 3 that the review switch 44 can only be closed when one of the microphones 22, 23 and 24 is removed from its cradle so that the remote dictating station is connected to the central dictating machine 1. Otherwise, the closing of the review switch 44 does not produce any connection between the lead 33 and the lead 98.

Negative potential also is supplied to the base of the transistor 134 from the lead 135 through a capacitor 137, a resistance 138, and a lead 139. A capacitor 140, which is connected between the lead 139 and ground, cooperates with the resistance 138 to form a time delay circuit for the signal from negative potential on the lead 135 to the base of the transistor 134. This delay is approximately fifty milliseconds and is sufficient to permit the clutch magnet 59 to be energized to allow the sound head 62 to be driven forward, as described in the aforesaid Albanes et al. application, to sample the recorded material on the magnetic belt 61.

The output of the read or review winding of the sound head 62 is connected to a circuit including a capacitor 141 and an inductance 142. The capacitor 141 and the inductance 142 are adjusted so that they are tuned to the frequency of the output of the tone generator 84 that has been recorded on the magnetic belt 61 at the end of the completion of any dictation by a remote dictating station in the manner described with respect to the embodiment of FIG. 3.

The inductance 142 of the tuned circuit is inductively coupled to an inductance 143, which is connected through a rectifier 144 to the base of the transistor 134. The rectifier 144 and the capacitor 140 cooperate to provide only the positive potential of the induced voltage at the base of the transistor 134. The other end of the inductance 143 is connected through a resistance 145 to ground.

Accordingly, if the sound head 62 is disposed over the portion of the magnetic belt 61 having the audio frequency of the tone generator 84 recorded thereon, positive potential applied to the base of the transistor 134 through the lead 139 from the inductance 143 prevents negative potential applied through the capacitor 137 from turning on the transistor 134 to allow the delay 130 to pick. In other words, the positive potential from the recorded audio signal is sufficient to prevent the relay 130 from being picked by the negative potential at the base of the transistor 134. However, as long as the review switch 44 is maintained closed, the clutch magnet 59 remains energized to eventually advance the sound head 62 out of the area in which the audio tone is recorded. Thereafter, actuation of the review switch 44 results in the relay 130 being picked because there would be no positive potential at the base of the transistor 134 resulting from an induced voltage in the inductance 143. Accordingly, this occurs when there is no signal on the magnetic belt 61 due to the tone generator 84 so that the relay 130 is picked.

When the relay 130 is picked, the contacts 131 and 132 close to energize the kickback relay 124. As a result, the sound head 62 is moved rearwardly with respect to the magnetic belt 61 to permit review of the recorded material as described in the aforesaid Albanes et al. application. If an effort is made to continue to obtain further actuation of the kickback relay 124 while listening to the recorded material, the capacitor 137 prevents this. This is because the capacitor 137 becomes charged in a short period of time from negative potential on the lead 135. Therefore, only one signal can be applied to the transistor 134 to pick the relay 130 until negative potential is removed from the lead 98 by opening the review switch 44. When the review switch 44 opens, the capacitor 137 discharges through the blocking diode 115 and the clutch magnet 59 to ground and then through a blocking diode 146.

It will be noted that the negative potential is not removed from the lead 33 when the review relay 130 is picked as in the circuit of FIG. 3. Accordingly, the operator at the remote dictating station could close his record switch 43 during review of the material recorded on the magnetic belt 61. If this were done, he could then erase a portion of the audio tone on the magnetic belt 61. This would be a laborious process in which a number of closings of the review switch 44 would be necessary to pick the kickback relay 124 and then automatically thereafter close the record switch 43. In this manner, one, who desperately wanted to review the prior dictated material on the recording magnetic belt 61, could do so with the circuit of FIG. 4.

However, the circuit of FIG. 4 is slightly simpler and less expensive than the circuit of FIG. 3. Therefore, if it is immaterial whether the various individuals at the remote dictating stations hear the prior dictated material, this circuit could be employed as it prevents any normal effort to return to the previously recorded material.

Additionally, if a frequency above audio range is the output of the tone generator 84, the laborious process could not be employed because the signal could not be heard. A signal with a frequency above audio range also is more desirable to the transcriber.

Considering the operation of the modification of FIG. 4, it will be assumed that there has been no dictation on the magnetic recording belt 61 and that the remote station 21 is connected to the central dictating machine 1 by lifting of the microphone 24 from its cradle to connect the remote dictating station 21 to the central dictating machine 1 as described in the aforesaid Albanes et al. application. At this time, the line relay 28 and the seizure relay 29 are picked and the record switch 43 and the review switch 44 of the station 21 may be connected to the leads 48 and 98, respectively.

If the dictator at the station 21 desires to review any of his recorded material, he merely closes the review switch 44 to apply negative potential to the lead 98. As a result, the relay 130 is picked since there is no voltage induced in the inductance 143 because there is no recording on the magnetic belt 61 of an audio tone at this time. Therefore, the kickback relay 124 may be picked to review the material by moving the sound head rearwardly with respect to the magnetic belt 61 as described in the aforesaid Albanes et al. application.

If the dictator replaces the microphone 24 in its cradle to disconnect the remote dictating station 21 from the central dictating machine 1, the line relay 28 is dropped but the seizure relay 29 remains picked since the forward run relay 71 has already been dropped by opening the record switch 43. This results in the switch blades 39 and 41 closing due to the force of the spring 79 moving the slider 40 relative with respect to the sound head 62.

As a result, a hold circuit is provided through the contacts 36 and 37 to maintain the seizure relay 29 picked. This results in negative potential being placed on the lead 69 to energize the tone generator 84. It also results in the clutch magnet 59 being energized whereby the sound head 62 advances to move the abutment 63 into the engagement with the switch blade 64. As soon as the switch blades 64 and 65 close, the record relay 52 is picked and the audio output from the tone generator 84 is recorded on the magnetic belt 61.

If the dictator at the remote dictating station 21 had been reviewing the dictated material but quit reviewing it before the end of the dictated material and then disconnected the remote station from the central dictating machine 1 by replacing the microphone 24 on its cradle, the clutch magnet 59 would be energized through the lead 69 so that the sound head 62 would be advanced forward until the abutment 63 again engaged the switch blade 64. At this time, the sound head 62 would have reached the end of the already dictated material because the slider 40 remained on the rod 75 at the completion of the dictated material when the sound head 62 was moved away from it by picking of the kickback relay 124 to review the recorded material. Accordingly, the slider 40 and the rod 75 insure that no recording of the audio output from the tone generator 84 occurs until after the end of the dictated material on the magnetic belt 61.

As explained with respect to FIG. 3, the seizure relay 29 has contacts (not shown) that prevent connection of any remote station to the central dictating machine until the seizure relay 29 is dropped. As soon as the recording of the audio tone is completed, the insulating member 70 on the switch blade 64 opens the switch blades 39 and 41 by engaging the switch blade 39. This results in the seizure relay 29 being dropped and a remote station may then be connected to the central dictating machine 1 as described in the aforesaid Albanes et al. application.

If it is assumed that the remote station 20 is now connected to the central dictating machine 1, any of the recorded material can be reviewed until the recorded audio tone is reviewed by the sound head 62. At this time, the positive voltage is induced through the inductance 143 and is applied to the base of the transistor 134. This positive voltage cuts off the transistor 134 so that any negative potential supplied through the capacitor 137 is not sufficient to pick the relay 130. Accordingly, the kickback relay 124 will not be picked and the dictator at the remote station 20 will not be able to listen to the previously recorded material unless he uses the tricky and devious method previously disclosed to erase the audio tone.

One significant distinction between the two circuits is that the positive potential of the audio tone is employed in FIG. 4 to cut off the transistor and prevent the relay from picking. However, in the modification of FIG. 3, the negative potential of the audio tone is supplied to the base of the transistor 105 so that the relay 101 will stay picked. Thus, in the modification of FIG. 4, no review can occur as long as the sound head 62 is over the audio portion of the tone generator 84 on the magnetic belt 61. However, in the modification of FIG. 3, the review relay 101 is picked once even though the sound head 62 may be over the recorded audio frequency of the tone generator 84 on the magnetic belt 61. However, no further picking of the relay 101 can occur because the relay 101 is kept picked by the negative portion of the induced voltage until the sound head 62 is advanced forward beyond the recorded audio tone.

If a PBX or private wire system is employed rather than the illustrated microphone system, the record switch 43 and the review switch 44 would be only at the central dictating machine as are the seizure relay 29 and the line relay 28. There would be only one record switch and one review switch for the entire system with each being controlled by a relay. Each of these relays could be energized only from the connected remote dictating station by the dialing system of the PBX or the number buttons of the private wire. Of course, the seizure relay 29 and the line relay 28 also are energized by the dialing system of the PBX or the number buttons of the private wire dictating system.

It should be understood that the recording-reproducing means could be separate units for recording and reproducing, if desired. Furthermore, if a circular disc is utilized as the recording medium, forward direction of the relative movement between the recording-reproducing means and the recording medium is in the direction of recording while rearward direction is the opposite.

An advantage of this invention is that the audio tone for isolating the prior dictated material is automatically recorded at the end of the dictated material when the remote dictating station is disconnected from the central dictating machine.

Another advantage of this invention is that the weight and cost of the dictating machine is less due to the use of electrical components rather than mechanical parts for providing privacy of the previously dictated material.

A further advantage of this invention is that the attendant does not have to return the recording medium to the end of the dictated material if the dictator ceases his review of the dictated material prior to the end thereof.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A control system for use with a central dictating machine having recording-reproducing means and a recording medium, the recording-reproducing means having a single record winding, at least one remote dictating station, each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time, said control system including:

means to automatically record a distinctive signal on the recording medium through the single record winding of the recording-reproducing means after the end of the recorded material of the disconnected station on the recording medium and on the same track as the recorded material of the disconnected station; and means responsive to said recorded distinctive signal to prevent listening at the next connected remote station to the material recorded on the recording medium prior to said distinctive signal.

2. A control system for use with a central dictating machine having recording-reproducing means and a recording medium, the recording-reproducing means having a single record winding, at least one remote dictating station, each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time, said control system including:

means to automatically return the recording-reproducing means of the dictating machine to the completion of the dictation on the recording medium if the connecting means is disconnected when the recording-reproducing means is not at the end of the dictation on the recording medium;

means to generate a distinctive signal when the connecting means is disconnected;

means to record said distinctive signal of said generating means through the single record winding of the recording-reproducing means on the recording medium and on the same track as the recorded material of the disconnected station;

means to prevent actuation of said recording means until the recording-reproducing means is at the completion of the dictation on the recording medium;

and means to automatically deactivate said recording means and said generating means simultaneously after said distinctive signal is recorded on said recording medium for a predetermined period of time.

3. A control system for use with a central dictating machine having recording-reproducing means and a recording medium, the recording-reproducing means having a single record winding, at least one remote dictating station, each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time, said control system including:

means to generate a distinctive signal when the connecting means is disconnected;

means to record said distinctive signal of said generating means through the single record winding of the recording-reproducing means on the recording medium and on the same track as the recorded material of the disconnected station after the completion of the dictation of the disconnected station on the recording medium;

means to insure that said distinctive signal is recorded after the completion of the dictation of the disconnected station on the recording medium;

means actuated by the review means of the next connected remote station to allow review of the recording medium by the recording-reproducing means;

and means responsive to said distinctive signal on the recording medium to prevent said actuating means from allowing the recording-reproducing means to return to the material recorded on the recording medium prior to recording of said distinctive signal.

4. A control system for use with a dictating machine having recording-reproducing means and a recording medium, the recording-reproducing means having a single record winding, a plurality of remote dictating stations, means to permit each of the stations to be separately connected at different time periods to the dictating machine for recording dictation from the station on the recording medium, and means to permit each of the stations to be connected to the dictating machine for listening at the station to dictation on the recording medium when the station is connected to the dictating machine for recording dictation, said control system including:

means to generate a distinctive signal when the connected station is disconnected from the dictating machine;

means to insure that the recording-reproducing means is at the end of the dictated material on the recording medium after the connected station is disconnected from the dictating machine;

means to record said distinctive signal on the recording medium through the single record winding of the recording-reproducing means after the completion of the dictated material of the disconnected station and on the same track as the dictated material of the disconnected station;

and means responsive to said distinctive signal on the recording medium to prevent any of the stations from listening to the material recorded on the recording medium prior to recording of said distinctive signal.

5. A control system for use with a dictating machine having recording-reproducing means and a recording medium, the recording-reproducing means having a single record winding, a plurality of remote dictating stations, means to permit each of the stations to be separately connected at different time periods to the dictating machine for recording dictation from the station on the recording medium, and means to permit each of the stations to be connected to the dictating machine for listening at the station to dictated material on the recording medium when the station is connected to the dictating machine for recording dictation, said control system including:

means to generate a distinctive signal when the connected station is disconnected from the dictating machine;

means to insure that the recording-reproducing means is at the end of the dictated material on the recording medium after the connected station is disconnected from the dictating machine;

means to record said distinctive signal on the recording medium through the single record winding of the recording-reproducing means after the completion of the dictated material of the disconnected station and on the same track as the dictated material of the disconnected station;

means responsive to said distinctive signal on the recording medium to prevent any of the stations from listening to the material recorded on the recording medium prior to recording of said distinctive signal;

said responsive means including a circuit tuned to the frequency of said distinctive signal and adapted to receive a signal from the recording medium when the material on the recording medium is being reviewed;

means coupled to said tuned circuit;

and control means having its input connected to said coupling means when the next connected station seeks to listen to the recorded material on the recording medium, said control means allowing the recording medium to be listened to by the next connected station unless its input receives a signal from said coupling means in response to said distinctive signal.

6. A control system for use with a dictating machine having recording-reproducing means and a recording medium, the recording-reproducing means having a single record winding, a plurality of remote dictating stations, means to permit each of the stations to be separately connected at different time periods to the dictating machine for recording dictation from the station on the recording medium, and means to permit each of the stations to be connected to the dictating machine for listening at the station to dictated material on the recording medium when the station is connected to the dictating machine for recording dictation, said control system including:

means to generate a distinctive signal when the connected station is disconnected from the dictating machine;

means to insure that the recording-reproducing means is at the end of the dictated material on the recording medium after the connected station is disconnected from the dictating machine;

means to record said distinctive signal on the recording medium through the single record winding of recording-reproducing means after the completion of the dictated material of the disconnected station and on the same track as the dictated material of the disconnected station;

means responsive to said distinctive signal on the recording medium to prevent any of the stations from listening to the material recorded on the recording medium prior to recording of said distinctive signal;

said responsive means including a circuit tuned to the frequency of said distinctive signal and adapted to receive a signal from the recording medium when the material on the recording medium is being reviewed;

means inductively coupled to said tuned circuit;

and a control element having its input connected to said coupling means when the next connected station seeks to listen to the recorded material on the recording medium, said control element allowing the recording medium to be listened to by the next connected station unless its input receives a signal from said coupling means in response to said distinctive signal.

7. A control system for use with a central dictating machine having recording-reproducing means and a recording medium, the recording-reproducing means having a single record winding, at least one remote dictating station, each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time, said control system including:

means to automatically record a distinctive signal on the recording medium through the single record winding of the recording-reproducing means for a predetermined period of time after the end of the recorded material of the disconnected station on the recording medium and on the same track as the recorded material of the disconnected station;

forward connecting means responsive to a signal from the review means of the next connected remote station to allow relative movement of the recording-reproducing means and the recording medium in a forward direction for review of the recorded material on the recording medium;

kickback means adapted to cause relative movement of the recording-reproducing means and the recording medium in a rearward direction when actuated;

and means to prevent said kickback means from being actuated when the output of the recording-reproducing means is said distinctive signal on the recording medium.

8. A control system for use with a central dictating machine having recording-reproducing means and a recording medium, at least one remote dictating station, each station having means to actuate the recording-reproducing means of the dictating machine for dictating from the station on the recording medium, means to actuate the recording-reproducing means for reviewing the materiel on the recording medium from the station, and means to connect the dictating means and the review means of only one station with the dictating machine at any time, said control system including:

means to automatically record a distinctive signal on the recording medium for a predetermined period of time after the end of the recorded material of the disconnected station on the recording medium, forward connecting means responsive to a signal from the review means of the next connected remote station to allow relative movement of the recording-reproducing means and the recording medium in a forward direction for review of the recorded material on the recording medium;

kickback means adapted to cause relative movement of the recording-reproducing means and the recording medium in a rearward direction when actuated;

a control relay adapted to receive a signal when the review means of the next connected remote station is actuated and adapted to control said kickback means;

a control element controlling the actuation of said control relay;

said control element receiving a first input from the signal produced by actuation of the review means of the next connected remote station;

means to delay the first input until review of the material on the recording medium has started due to actuation of said forward connecting means;

said control element receiving a second input when the recording medium has said distinctive signal thereon;

and said control element preventing actuation of said control relay when receiving said second input to prevent actuation of said kickback means and allowing actuation of said control relay when receiving only said first input whereby said kickback means is actuated.

9. A control system for use with a central dictating machine having recording-reproducing means and a recording medium, at least one remote dictating station, each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time, said control system including:

means to automatically record a distinctive signal on the recording medium for predetermined period of time after the end of the recorded material of the disconnected station on the recording medium;

forward connecting means adapted to allow relative movement of the recording-reproducing means and of the recording medium in a forward direction when actuated;

said forward connecting means being actuated in response to a signal from the review means of the next connected remote station;

kickback means adapted to cause relative movement of the recording-reproducing means and the recording medium in a rearward direction when actuated;

a control relay adapted to receive an input from the signal from the review means of the next connected remote station;

means to control the response of said control relay to the signal from the review means of the next connected remote station;

said control means receiving a first input from the signal from the review means of the next connected remote station and a second input from a signal responsive to said distinctive signal on the recording medium when the recording-reproducing means is receiving said distinctive signal from the recording medium;

said control means allowing actuation of said control relay when said control means receives said first input whereby said kickback means is actuated;

means to disconnect said first input from said control means after a predetermined period of time;

said control means deactivating said control relay when said first input is disconnected from said control means unless said control means is receiving said second input;

said control means maintaining actuation of said control relay until said control means ceases to receive said second input;

and means to prevent recording of material on the recording medium when said control relay is actuated.

10. A control system for use with a central dictating machine having recording-reproducing means and a recording medium, at least one remote dictating station, each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time, said control system including:

means to automatically record a distinctive signal on the recording medium for a predetermined period of time after the end of the recorded material of the disconnected station on the recording medium;

forward connecting means adapted to allow relative movement of the recording-reproducing means and the recording medium in a forward direction when actuated;

said forward connecting means being actuated in response to a signal from the review means of the next connected remote station;

kickback means adapted to cause relative movement of the recording-reproducing means and the recording medium in a rearward direction for a predetermined distance when actuated;

means responsive to the signal from the review means of the next connected remote station to cause actuation of said kickback means;

and means responsive to said distinctive signal to prevent further actuation of said kickback means.

11. A control system for use with a central dictating machine having recording-reproducing means and a recording medium, at least one remote dictating station, each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time, said control system including:

means to automatically record a distinctive signal on the recording medium for a predetermined period of time after the end of the recorded material of the disconnected station on the recording medium;

forward connecting means adapted to allow relative movement of the recording-reproducing means and the recording medium in a forward direction when actuated;

said forward connecting means being actuated in response to a signal from the review means of the next connected remote station;

kickback means adapted to cause relative movement of the recording-reproducing means and the recording medium in a rearward direction for a predetermined distance when actuated;

means responsive to the signal from the review means of the next connected remote station to cause actuation of said kickback means;

said signal responsive means preventing actuation of the dictating means of the next connected remote station;

and means to maintain the dictating means from actuation as long as the recording-reproducing means is receiving said distinctive signal from the recording medium.

12. A central dictating system comprising:

a central dictating machine having recording-reproducing means and a recording medium, the recording-reproducing means having a single record winding;
at least one remote dictating station;
each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time;
means to automatically record a distinctive signal on the recording medium through the single record winding of the recording-reproducing means after the end of the recorded material of the disconnected station on the recording medium and on the same track as the recorded material of the disconnected station;
and means responsive to said recorded distinctive signal to prevent listening at the next connected remote station to the material recorded on the recording medium prior to said distinctive signal.

13. A central dictating system comprising:
a central dictating machine having recording-reproducing means and a recording medium, the recording-reproducing means having a single record winding;
at least one remote dictating station;
each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time;
means to automatically return the recording-reproducing means of the dictating machine to the completion of the dictation on the recording medium if the connecting means is disconnected when the recording-reproducing means is not at the end of the dictation on the recording medium;
means to generate a distinctive signal when the connecting means is disconnected;
means to record said distinctive signal of said generating means through the single record winding of the recording-reproducing means on the recording medium and on the same track as the recorded material of the disconnected station;
means to prevent actuation of said recording means until the recording-reproducing means is at the completion of the dictation on the recording medium;
and means to automatically deactivate said recording means after said distinctive signal is recorded on said recording medium for a predetermined period of time.

14. A central dictating system comprising:
a central dictating machine having recording-reproducing means and a recording medium, the recording-reproducing means having a single record winding;
at least one remote dictating station;
each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time;
means to generate a distinctive signal when the connecting means is disconnected;
means to record said distinctive signal of said generating means through the single record winding of the recording-reproducing means on the recording medium and on the same track as the recorded material of the disconnected station after the completion of the dictation of the disconnected station on the recording medium;
means to insure that said distinctive signal is recorded after the completion of the dictation of the disconnected station on the recording medium;
means actuated by the review means of the next connected remote station to allow review of the recording medium by the recording-reproducing means;
and means responsive to said distinctive signal on the recording medium to prevent said actuating means from allowing the recording-reproducing means to return to the material recorded on the recording medium prior to recording of said distinctive signal.

15. A central dictating system comprising:
a central dictating machine having recording-reproducing means and a recording medium, the recording-reproducing means having a single record winding;
at least one remote dictating station;
each station having means to actuate the recording-reproducing means of the dictating machine for dictating from the station on the recording medium, means to actuate the recording-reproducing means for reviewing the material on the recording medium from the station, and mean to connect the dictating means and the review means of only one station with the dictating machine at any time;
means to automatically record a distinctive signal on the recording medium through the single record winding of the recording-reproducing means for a predetermined period of time after the end of the recorded material of the disconnected station on the recording medium and on the same track as the recorded material of the disconnected station;
forward connecting means responsive to a signal from the review means of the next connected remote station to allow relative movement of the recorded-reproducing means and the recording medium in a forward direction for review of the recorded material on the recording medium;
kickback means adapted to cause relative movement of the recording-reproducing means and the recording medium in a rearward direction when actuated;
and means to prevent said kickback means from being actuated when the output of the recording-reproducing means is said distinctive signal on the recording medium.

16. A central dictating system comprising:
a central dictating machine having recording-reproducing means and a recording medium;
at least one remote dictating station;
each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time;
means to automatically record a distinctive signal on the recording medium for a predetermined period of time after the end of the recorded material of the disconnected station on the recording medium;
forward connecting means responsive to a signal from the review means of the next connected remote station to allow relative movement of the recording-reproducing means and the recording medium in a forward direction for review of the recorded material on the recording medium;
kickback means adapted to cause relative movement of the recording-reproducing means and the recording medium in a rearward direction when actuated;
a control relay adapted to receive a signal when the review means of the next connected remote station is actuated and adapted to control said kickback means;

a control element controlling the actuation of said control relay;

said control element receiving a first input from the signal produced by actuation of the review means of the next connected remote station;

means to delay the first input until review of the material on the recording medium has started due to actuation of said forward connecting means;

said control element receiving a second input when the recording medium has said distinctive signal thereon;

and said control element preventing actuation of said control relay when receiving said second input to prevent actuation of said kickback means and allowing actuation of said control relay when receiving only said first input whereby said kickback means is actuated.

17. A central dictating system comprising:

a central dictating machine having recording-reproducing means and a recording medium;

at least one remote dictating station;

each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time;

means to automatically record a distinctive signal on the recording medium for a predetermined period of time after the end of the recorded material of the disconnected station on the recording medium;

forward connecting means adapted to allow relative movement of the recording-reproducing means and the recording medium in a forward direction when actuated;

said forward connecting means being actuated in response to a signal from the review means of the next connected remote station;

kickback means adapted to cause relative movement of the recording-reproducing means and the recording medium in a rearward direction when actuated;

a control relay adapted to receive an input from the signal from the review means of the next connected remote station;

means to control the response of said control relay to the signal from the review means of the next connected remote station;

said control means receiving a first input from the signal from the review means of the next connected remote station and a second input from a signal responsive to said distinctive signal on the recording medium when the recording-reproducing means is receiving said distinctive signal from the recording medium;

said control means allowing actuation of said control relay when said control means receives said first input whereby said kickback means is actuated;

means to disconnect said first input from said control means after a predetermined period of time;

said control means deactivating said control relay when said first input is disconnected from said control means unless said control means is receiving said second input;

said control means maintaining actuation of said control relay until said control means ceases to receive said second input;

and means to prevent recording of material on the recording medium when said control relay is actuated.

18. A central dictating system comprising:

a central dictating machine having recording-reproducing means and a recording medium;

at least one remote dictating station;

each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time;

means to automatically record a distinctive signal on the recording medium for a predetermined period of time after the end of the recorded material of the disconnected station on the recording medium;

forward connecting means adapted to allow relative movement of the recording-reproducing means and the recording medium in a forward direction when actuated;

said forward connecting means being actuated in response to a signal from the review means of the next connected remote station;

kickback means adapted to cause relative movement of the recording-reproducing means and the recording medium in a rearward direction for a predetermined distance when actuated;

means responsive to the signal from the review means of the next connected remote station to cause actuation of said kickback means;

and means responsive to said distinctive signal to prevent further actuation of said kickback means.

19. A central dictating system comprising:

a central dictating machine having recording-reproducing means and a recording medium;

at least one remote dictating station;

each station having means to actuate the recording-reproducing means of the dictating machine for dictating from the station on the recording medium, means to actuate the recording-reproducing means for reviewing the material on the recording medium from the station, and means to connect the dictating means and the review means of only one station with the dictating machine at any time;

means to automatically record a distinctive signal on the recording medium for a predetermined period of time after the end of the recorded material of the disconnected station on the recording medium;

forward connecting means adapted to allow relative movement of the recording-reproducing means and the recording medium in a forward direction when actuated;

said forward connecting means being actuated in response to a signal from the review means of the next connected remote station;

kickback means adapted to cause relative movement of the recording-reproducing means and the recording medium in a rearward direction for a predetermined distance when actuated;

means responsive to the signal from the review means of the next connected remote station to cause actuation of said kickback means;

said signal responsive means preventing actuation of the dictating means of the next connected remote station;

and means to maintain the dictating means from actuation as long as the recording-reproducing means is receiving said distinctive signal from the recording medium.

20. A control system for use with a central dictating machine having recording-reproducing means and a recording medium, at least one remote dictating station, each station having means to actuate the recording-reproducing means of the dictating machine for dictating from the station on the recording medium, means to actuate the recording-reproducing means for reviewing the material on the recording means from the station, and means to connect the dictating means and the review means of only one station with the dictating machine at any time, said control system including:

means to generate a distinctive signal when the connecting means is disconnected;

means to record said distinctive signal of said generating means on the recording medium after the completion of the dictation of the disconnected station on the recording medium;

forward connecting means adapted to allow relative movement of the recording-reproducing means and the recording medium in a forward direction when actuated;

said forward connecting means being actuated in response to a signal from the review means of the next connected remote station;

kickback means adapted to cause relative movement of the recording-reproducing means and the recording medium in a rearward direction when actuated;

and means to control actuation of said kickback means to prevent the recording-reproducing means returning to the material recorded on the recording medium prior to recording of said distinctive signal, said control means receiving a first input from the signal from the review means of the next connected remote station and a second input from a signal responsive to said distinctive signal on the recording medium when the recording-reproducing means is receiving said distinctive signal from the recording medium.

References Cited by the Examiner

UNITED STATES PATENTS

| | | | |
|---|---|---|---|
| 2,816,177 | 12/1957 | Logan | 179—100.1 |
| 2,864,895 | 12/1958 | Bryant | 179—100.2 |
| 3,197,562 | 6/1965 | Happold et al. | 179—6 |

TERRELL W. FEARS, *Primary Examiner.*

IRVING SRAGOW, *Examiner.*

G. LIEBERSTEIN, *Assistant Examiner.*